Nov. 25, 1969 W. E. OSBORNE 3,480,775
RADIATION SENSITIVE OMNIDIRECTIONAL MOTION DETECTOR SYSTEM
Filed Aug. 17, 1964
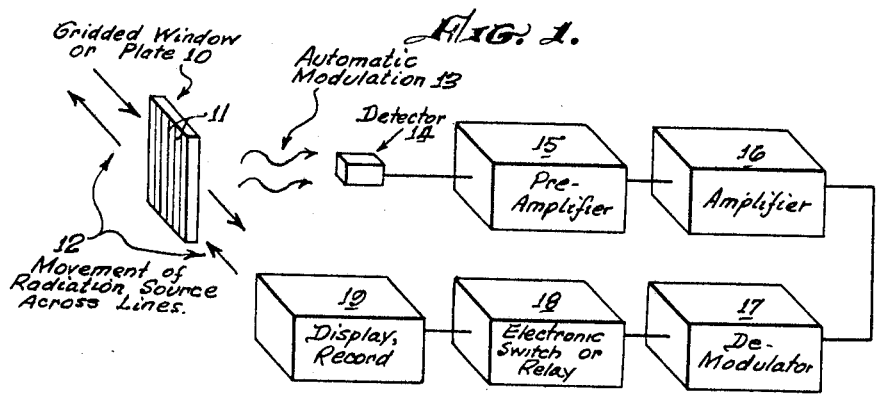
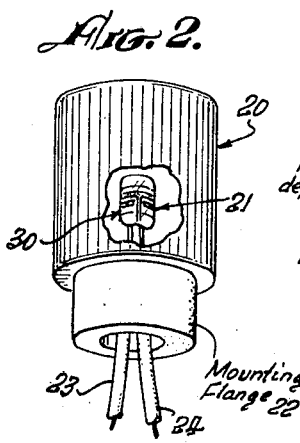
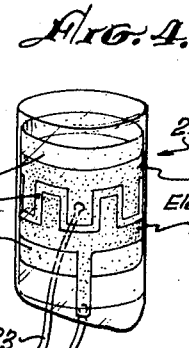
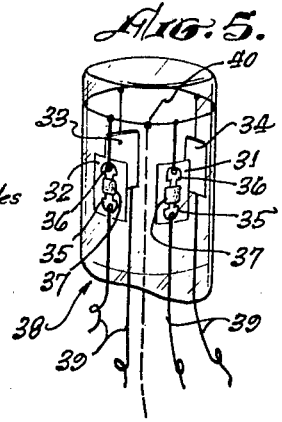
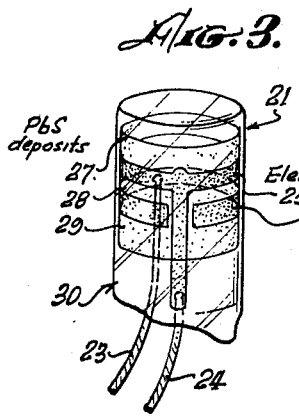
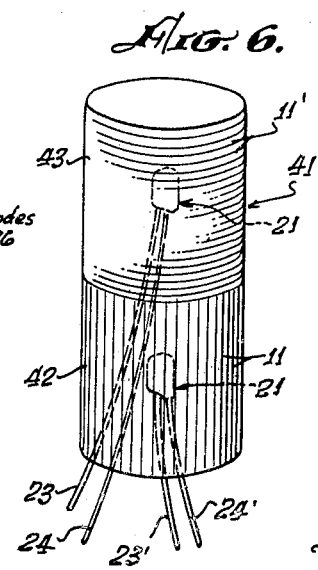
INVENTOR.
WILLIAM E. OSBORNE,
By John H. Haglwood
ATTORNEY.

United States Patent Office 3,480,775
Patented Nov. 25, 1969

3,480,775
RADIATION SENSITIVE OMNIDIRECTIONAL MOTION DETECTOR SYSTEM
William E. Osborne, Whittier, Calif., assignor to General Dynamics Corporation, Pomona, Calif., a corporation of Delaware
Filed Aug. 17, 1964, Ser. No. 389,870
Int. Cl. G01t 1/16; H01j 39/00
U.S. Cl. 250—83.3                    4 Claims

ABSTRACT OF THE DISCLOSURE

Broadly, this invention is directed to a motion detector system of the passive type which is activated by a source of radiant energy moving past a gridded dome. The grid lines of the dome are in the order of about 25 to 400 lines per inch and function to modulate a detector assembly which transmits the signal to a point of use.

---

This invention relates to detector systems, and more particularly to motion detectors where the object in motion possesses characteristics which are inherently different from those of the ambient or general background.

A simple and economical system has long been desired for detecting intruders in homes, businesses, and classified areas. Since people are all walking infrared transmitters, operating at about 500 watts and transmitting on a wavelength of about 9.3 microns, passive infrared, for example, has important advantages. This could be bad news to burglars, spies and curiosity seekers, if the victims of their activities have an infrared intruder alarm system.

Most all other detecting systems—ultrasonic, Doppler, capacitance or inductance change—need a transmitter, which, though small and of minute power, is easily detectable and therefore a target for countermeasures. Also, harmonics of the known systems can create spurious triggers and interfere with other equipment.

In the passive detection system of the invention, the intruder himself is the transmitter, as all objects above absolute zero radiate electromagnetic energy. The temperature of human blood, 98.6° F., represents a wavelength of approximately 9.3 microns, which is readily detected by a means such as a photoconductive cell. The detector of the invention has no moving parts, and for example, may have a volume of about two cubic inches, and a drain of less than two milliamperes; a small battery or power supply adds another two cubic inches while the alarm or display is a separate device. The optics of the system can be designed for an indium antimonide cell or an inexpensive lead sulphide unit. Omnidirectional surveillance is obtained with a cylindrical dome; etched lines on the dome chop the signal as the intruder moves across the detector field. The dome or cylindrical gridded plate which modulates or chops the incoming infrared (IR) energy is basically of the same concept disclosed in applicant's U.S. Patent No. 2,975,284 but constructed in a cylindrical configuration for omnidirectional detection.

Therefore, it is an object of this invention to provide a detector system.

Another object of the invention is to provide a passive infrared detector system.

Another object of the invention is to provide an infrared detector system for detecting intruders.

Another object of the invention is to provide a detector system utilizing a gridded cylindrical dome for omnidirectional detection.

Another object of the invention is to provide a system for the detection of intruders or any motion of other objects which possess a temperature or thermal differential from that of the background.

Another object of the invention is to provide a detector system which is of the passive type and therefore not subject to countermeasures thereagainst.

Other objects of the invention not specifically set forth above will become readily apparent from the following description and accompanying drawings wherein:

FIG. 1 is a block diagram illustrating the invention;
FIG. 2 is a view of an embodiment of a gridded dome with a portion thereof cut away to show the detector unit;
FIG. 3 illustrates an embodiment of a detector cell;
FIG. 4 illustrates a further embodiment of a detector cell;
FIG. 5 illustrates another embodiment of a detector unit of the invention; and
FIG. 6 is a perspective view of a further embodiment of the gridded dome.

In accordance with the present invention, it should be emphasized that two (2) requirements are simultaneously necessary to operate this detector. These are (1) a radiation source (which could be an intruder), and (2) an angular motion of such radiation source with respect to the detector.

For efficient detection of a radiation source particularly in the electromagnetic spectrum between one and fifteen microns in wavelength, which concerns many applications to be described herein, a chopping disc or reticle has previously been used (for most applications) in front of the detector cell or element. This reticle modulates the incoming infrared or other radiation at a frequency which is directly proportional to the speed of the reticle and the number of slots, lines, or holes in or upon it. Amplification at this modulation frequency then follows the detection function. The signal is finally de-modulated, and the remaining component provides information regarding the position of the original radiation source. Other modulation methods involve electronic scanning of a plurality of detectors. However, while the aforementioned modulation methods (which are conventional and widely used) are all active ones, involving the use of either motor-driven reticles or by oscillators, the present invention describes a passive method in which the radiation source (such as an intruder) not only provides the carrier signal, but the modulation as well. Thus no moving parts are necessary in either the detector or amplifier.

To obtain such a means of automatic or self-modulation by the detected object or person (or animal), fine black or opaque lines are etched or deposited either upon the detector cell or element itself, or upon the optics thereof. These lines, which are opaque to the wavelength of the desired transmissions, then chop the radiation from the source as the latter moves in an angular direction with respect to the lines. A modulation frequency, riding on the main radiation carrier, is thus automatically created, and this frequency is directly proportional to the number, width, and spacing of the opaque lines between the detector and the target source; to the distance between source and detector; and also the angular speed of the source. As a practical example, using this invention for detection of intruders as previously mentioned, a range of ten feet (between detector and intruder) with an angular speed of one foot per second, would create a modulation frequency of approximately 6.25 cycles per second if the optical lines were 100 per inch. An increase in either the number of lines per inch or the speed of the intruder would increase the modulation frequency, as also a lesser range between detector and target. Conversely, decreasing the number of lines and speed, or increasing the range, will lower the frequency. The wavelength of the transmitted carrier, in the above example, would be close to that of human blood (98.6° F.), or approximately 9.3 to 9.5 microns.

Since an object of this invention is the automatic and passive modulation method described above, the ultimate range of the detector with its associated amplifier is of no particular concern here. However, in infrared receivers already built, using the gridded optics as in this invention, ranges of several miles have been achieved where the source temperature matched the response and transmission characteristics of the detector cell and optical window, respectively.

As illustrated in FIG. 2, described in detail hereinafter, the optical window or dome, in this application, is inscribed with black or opaque vertical lines. An angular movement in a lateral direction is necesary here to modulate the detector, which is mounted inside the dome. If the lines were lateral instead of vertical, a vertical movement of the source would be required for a modulating signal. A cross-hatch pattern of lines will produce a signal from any movement in any direction.

While the distance between each of the grid lines would, for most applications, be equal, there may be special requirements for which variably-spaced lines would more efficiently operate. A modulation signal of rising or falling frequency (at a uniform angular speed) would then result. Such occasions could arise if the device was applied, by infrared techniques, to speed measurements of vehicles, where the face of the IR optics was not parallel to the passing vehicle.

From the foregoing, it will readily be seen that the potential applications of this invention are quite numerous. In addition to its use as a motion detector to trigger an intrusion alarm, a traffic control system for either freeways or highways could profitably utilize the device to count vehicles, measure their speed, and trigger a telemetering oscillator. This would then turn on flasher signs at on-ramps (or off-ramps) to reduce the amount of traffic, and thereby eliminate congestion. Also, the invention could be used for the activation of explosives, such as anti-personnel or anti-vehicle mines.

Another application of the invention would be in aircraft landing systems, where the automatic modulation (provided by chopping the IR radiation from the aircraft) would provide on-course information. Accident prevention at the doors of elevators, subway trains, and other vehicles would be possible. Parking meters could be zeroed by the movement of a departing car. Still other applications include precise measurement of angle rate-of-change in missiles; as a missile or aircraft tracker (no signal signifies "on-target"); and for police use in measuring the speed of passing automobiles from an angular location. Furthermore, the efficiency of the device is obviously not limited to the infrared spectrum as ultraviolet and light frequencies, and even sub-millimeter radio and radar frequencies, could be automatically modulated by this method, provided the window material which carried the opaque lines would pass the frequencies involved. Going still further, no window (dome) material is necessary where the lines are self-supporting such as in a microwave system which utilizes wire mesh only as the modulation media.

Many other variations and applications are possible, and it must therefore be stressed that the foregoing discussion and the following specific embodiments are meant to be illustrative only and should not be considered as limitative of the invention.

A plurality of the griddled optics or domes could be used, and an example of this would be to prevent or minimize false alarms in a motion detector or intrusion detector. With two domes (one with vertical lines, the other with horizontal lines), and two detectors, one could be used to develop an opposing bias in the other, and thus minimize false alarms. Thus with an intrusion alarm system that triggered on a lateral motion of the intruder, and therefore contained vertical lines on the optics, an opposing bias could be produced by a second unit with horizontal lines whenever a diagonal motion—at some preset angle from true horizontal—occurred. This false alarm prevention approach could be applied to a single dome as shown in FIG. 6 wherein both vertical and horizontal lines are inscribed.

Any number of gridded or lined domes could in fact be used, and with any variation of line directions, spacing, thickness, or number to suit the particular application. The shape and composition of the dome is irrelevant, provided that this is transparent to infrared or whatever frequency is transmitted for the purpose of modulation as described herein. Likewise, the composition of the line material is only limited by the fact that it must be opaque to the transmitted frequency.

With the detector system of the present invention, if for example, limited range is desirable, receiver sensitivity can be low. Cell optics could consist simply of an IR dome with grid lines and three dielectric films on the inside of the dome for IR filtering. Range would be approximately 50 feet but could be increased to compensate for fog or rain in outside installations.

In the specific example set forth above, the IR spectrum of interest for detecting people and animals extends from 2.3 microns (filter cutoff) to 11 microns. Although PbS cell response is nil for 5 microns and longer wavelengths, enough energy is provided by spectral distribution to give a usable signal in the cell response range. Also, the target is not a black body and the radiating surfaces of skin and clothes vary in efficiency. Response of the room-temperature cell at its peak (2.45 microns) is down about 1,000 times with respect to a black body at 9.3 microns but response at 3 microns is still ⅕ of maximum and the available signal is ten times stronger at this point. Net loss at 3 microns is therefore 54 db, which is satisfactory with a modern PbS cell. About 0.1 percent of the energy from a 9½ micron target is available as signal.

Intruder temperature differs from ambient, and clothing will be cooler than skin; if face and hands are covered, a response to about 80° F. or 9½ microns will be required. On cold days, this could become 30° F. or 10½ microns. With the above example, an intruder moving at one foot per second and 10 feet away would generate 6.25 c.p.s. with a 4-inch circumference dome etched with 100 lines per inch. The number of lines per inch can vary from about 25 to 400, or more.

As pointed out above, false alarms are a problem in all detector systems. Many improvements could be made to the basic concept illustrated in FIG. 1 to meet special requirements. Assuming the gridline or automatic scan feature is retained, positioning data could be obtained from multiple cells, each individually collimated, with either a time-sharing switch or separate receivers. In a larger receiver, a range-gating and noise-gating could be added, together with frequency multipliers that would simplify design and reduce cost. To prevent false alarms in outdoor operation from falling snow or blowing leaves, a spectral cut-off above about 10 microns could be obtained with an interference filter.

The PbS cell, such as the example illustrated in FIG. 3 and tested, was designed with lowest possible resistance consistent with high sensitivity. Uncooled dark resistance of the cell was 97,000 ohms and amplifier input impedance at 100 c.p.s. was approximately 115,000 ohms. Gold electrode leads were used in the cell, which contained two circular electrodes sublimed in an evacuated envelope of arsenic trisulfide ($ASgS_3$). This material was also used for the IR dome. It has a spectral transmission of almost 60 percent (for 2 mm. thickness) at the maximum required wavelength of 11 microns and can be machined easily.

Detector cells of the PEM (photoelectromagnetic) type of indium antimonide may also be used uncooled, and improve performance by about 100 percent, since response peaks at over 6 microns. Relative sensitivity is lower than PbS by approximately 2.2 orders of magnitude, but the signal energy from a human target to an InSb cell is more than a hundred times greater. The low impedance of the PEM InSb cell (30 to 200 ohms) is also attractive but its cost is several times the cost of commercial PbS types and thus unsuited to small home or business alarm installations, although satisfactory for military, bank and similar security applications.

To reduce false alarms from blowing objects in outside areas, horizontal etched lines on a second IR dome can feed another detector cell. The amplified signal is rectified to place a holding bias on the main receiver, as pointed out above. Objects blowing or falling within about 45 degrees of vertical activate this hold, and prevent about 70 percent of false alarms.

With the example tested, heavy rain (from 0.1 to 2 inches per hr.) over a detection path of 20 meters cut down the signal to 0.152 percent of the original. At 9.3 microns, the energy radiated by a human being, neglecting clothing, is approximately $5 \times 10^{-2}$ watt per $cm.^2$. Assuming one square meter for total skin area, IR radiation is 500 watts total. Estimating an attenuation factor of 20 for further scattering, 100 for clothing (with consequent shift in wavelength), and 1,000 for spectral distribution losses, noise level at the receiver is $2.5 \times 10^{-8}$ watt per $cm.^2$ for a target at 20 meters. With a signal to noise ratio of 2 to 1, required receiver sensitivity is $5 \times 10^{-8}$ watt per $cm.^2$, which is low by normal standards.

No optical gain was used in the example of the receiver tested (although it could be introduced) and thus represents a large loss. While the sensitivity with optics is approximately $1 \times 10^{-11}$ watt per $cm.^2$, the level without optics is nearer $7 \times 10^{-8}$ watt per $cm.^2$. This still gives adequate sensitivity for operation in rain of a distance up to 100 feet or more. Cooling the detector cell with $CO_2$ would give an additional gain factor of 200, which included the additional signal available from extended wavelength response.

Referring now to the embodiments of the invention shown in the drawing, the block diagram of FIG. 1 broadly illustrates the function of the motion detector system wherein the window is shown in the form of a plate 10 with a plurality of spaced grids 11 with arrows 12 indicating movement of a radiation source across grid lines 11, the radiation source being an intruder or the like. The radiation source provides the carrier signal which is automatically modulated or chopped by movement of the source across the lines 11 as indicated at 13. The modulated carrier signal is then passed to a detector unit 14. Output signals from detector 14 are passed through a pre-amplifier 15, an amplifier 16, a de-modulator 17, and an electronic switch or relay unit 18 to a display, alarm or recorder unit 19. Since the elements 15–19 are conventional units and their function well known to those skilled in the art, a description thereof is deemed unnecessary.

While the gridded window has been generally shown in the form of a plate 10, it is preferred to utilize a cylindrical or dome configuration for omnidirectional use as illustrated, for example, in FIG. 2 wherein the dome 20, which could for example be constructed of arsenic trisulfide, is provided with equally spaced vertical lines 11 for automatic modulation of the carrier signal. Lines 11 are opaque to the type of radiation transmitted and may be applied to dome 20 by depositing, etching or other conventional process. A detecting unit such as detector cell 21, which could be an IR cell, is mounted within dome 20 by means such as mounting flange 22 which may be constructed of aluminum or other type material, flange 22 having a central bore therein through which leads 23 and 24 from detector cell 21 extend. Detector cell 21 receives chopped (modulated) signals at a frequency directly proportional to the range, speed, number and spacing of the lines, and the size of the detector. The output signal from cell 21 is passed through lead 23 or 24 to the pre-amplifier 15. In applications where the output signal from detector cell 21 is of sufficient strength, the pre-amplifier 15 may be omitted and leads 23 and 24 would be operatively connected to amplifier 16.

FIGS. 3–5 illustrate embodiments of the detector unit 14. As shown in FIG. 3, detector cell 21 is provided with a deposit of lead sulphide (PbS) indicated at 27, 28 and 29. A pair of spaced electrodes 25 and 26 which are operatively connected with leads 23 and 24, respectively, are deposited on the PbS. The electrodes and PbS layers are enclosed in an infrared-transparent capsule indicated at 30. While it is preferable that the electrodes 25 and 26 be of gold, they may be of Aquadag or other type of conducting material. Aquadag is a trademark of the Acheson Colloids Co. for their brand of colloidal graphite in water. Also, indium antimonide or other suitable detecting material may be used instead of the lead sulphide indicated at 27, 28 and 29. The type of material used and the manner of depositing the electrodes and the detector material in the cell 21 will be dependent on the sensitivity required and the expense involved in the different applications of the detector system. Also, the spacing of the electrodes determines the sensitivity of the cell.

The embodiment of cell 21 illustrated in FIG. 4 differs from the FIG. 3 embodiment only in the configuration of electrodes 25' and 26' and the configuration of the PbS deposit indicated at 28' located between the electrodes. The construction of cell 21 and the material utilized in the FIG. 4 embodiment may be of the types described above.

In FIG. 5 is shown an arrangement whereby omnidirectional coverage is obtained by four flat cells mounted at 90° intervals around a small cylindrical former. Each cell is provided with two electrodes and a semi-conductive deposit which is sensitive, in this case, as an example only, to infrared radiation as described previously. Although the FIG. 5 embodiment of the detector unit differs substantially in construction from that shown in FIGS. 3 and 4, it may be constructed of any of the materials described above with respect thereto. The detector unit 14 is provided with four (4) cells having sets 31, 32, 33 and 34 of electrodes 35 and 36, each set of electrodes 35 and 36 being separated by a PbS deposit 37. The electrode sets 31–34 are positioned around the capsule or former 38 at approximately 90 degrees. Each of the electrodes 35 is operatively connected to leads 39 which are individually operatively connected to pre-amplifiers such as 15 or to amplifiers such as 16 if the signals therefrom are of sufficient strength to eliminate the need of a preamplifier. Each of the electrodes 36 is interconnected to a common bias lead 40 which is operatively connected as described above. Again, it is preferred that electrodes 35 and 36 be made of gold but other conducting material such as Aquadag may be utilized. Also, the PbS deposit 37 may be replaced with other types of detecting material such as indium antimonide (InSb). Any conventional method may be utilized in the construction of the FIG. 5 cell arrangement. If only directional coverage is desired, the FIG. 5 detector unit may be modified by removing one or more of the individual cells therein.

Referring now to the FIG. 6 embodiment, the gridded cylindrical or dome type window 41 is designed to prevent false alarms by providing a lower portion 42 of the dome with vertical grid lines 11 while an upper portion 43 of the dome is provided with horizontal grid lines 11'. A detector unit (not shown) such as illustrated in FIGS. 2–5 is positioned within each dome portion 42 and 43. The detector cell within the lower portion 42 of dome 41 is provided with leads 23 and 24 while the detector cell within the upper portion 43 of dome 41 is provided with leads 23' and 24' which are operatively connected to respective pre-amplifiers or amplifiers in the manner set forth hereinbefore. Thus movement in either a horizontal or vertical direction with respect to dome 41 will be detected by the cells therein.

It has thus been shown that this invention provides a simple and yet effective motion detector means which may utilize infrared, ultra-violet and light frequencies as well as sub-millimeter and microwave frequencies. Also, the equally spaced lines on the gridded dome, which are opaque to the wavelength of the desired transmissions, may be etched or deposited in a diagonal direction, or the lines may be variably spaced.

Although specific embodiments of the invention have been illustrated and described, modifications thereof will be apparent to those skilled in the art, and it is intended to cover in the appended claims all such modifications as come within the spirit and scope of the invention.

What I claim is:

1. An omnidirectional motion detector system comprising: a first cylindrical hollow member having thereon a plurality of spaced grid lines per inch, said grid lines being spaced in the range between 25 to about 400 lines per inch, grid lines being vertically aligned and equally spaced, said first cylindrical hollow member having a circular cross sectional configuration; said spaced grid lines being located over the circular surface of said first cylindrical hollow member; a second cylindrical hollow member having a circular cross sectional configuration operatively positioned within said first cylindrical hollow member such that the outer periphery of said second cylindrical hollow member is substantially equidistant at a predetermined distance from the inner periphery of said first cylindrical hollow member; a plurality of infrared detectors operably mounted on the outer periphery of said second cylindrical hollow member and sensitive to direct impingement of infrared energy from any direction passing through said first cylindrical hollow member; an amplifying means operatively connected to each of said infrared detectors and responsive thereto; demodulating means operatively connected to each of said amplifying means and responsive thereto; and output means operatively connected to each of said demodulating means for indicating movement with respect to said first cylindrical hollow member, whereby transverse movement of infrared energy with respect to said grid lines of said first cylindrical hollow member causes modulation of the infrared energy which is detected by said infrared detectors and passed through said amplifying means and said demodulating means to said means for indicating movement.

2. An omnidirectional motion detector system comprising: A first cylindrical hollow member having a plurality per inch of spaced grid lines of about 100 lines per inch thereon, said spaced grid lines being located over the surface of said first member, a first portion of said spaced grid lines being opaque to an infrared signal being passed through said first member, said first portion of said grid lines being vertically aligned and equally spaced, a second portion of said spaced grid lines being opaque to an infrared signal being passed through said first member, said second portion of said grid lines being horizontally aligned and equally spaced; a second cylindrical hollow member operatively positioned within said first cylindrical hollow member such that the outer periphery of said second cylindrical hollow member is substantially equidistant at a predetermined distance from the inner periphery of said first cylindrical hollow member; a plurality of infrared detectors operably positioned on the outer periphery of said second cylindrical hollow member and sensitive to direct impingement of infrared energy from any direction passing between said spaced grid lines of said first member; amplifier means operatively connected to each of said infrared detectors and responsive thereto; demodulator means operatively connected to each of said amplifier means and responsive thereto; and an output means operatively connected to each of said demodulator means, whereby signals generated by movement with respect to said first cylindrical hollow member are detected by said detectors and passed through said amplifier means and said demodulator means to said output means.

3. The omnidirectional motion detector system defined in claim 1, wherein said plurality of spaced grid lines per inch are horizontally aligned and equally spaced in the range between 25 to about 400 lines per inch.

4. The omnidirectional motion detector system defined in claim 1, wherein said first cylindrical hollow member is provided with a first portion of spaced grid lines per inch, said first portion of spaced grid lines being vertically aligned and equally spaced in the range between 25 to about 400 lines per inch, said first member also being provided with a second portion of spaced grid lines per inch, said second portion of spaced grid lines being horizontally aligned and equally spaced in the range between 25 to about 400 lines per inch.

References Cited

UNITED STATES PATENTS

| | | | |
|---|---|---|---|
| 2,115,578 | 4/1938 | Hall | 250—83.3 X |
| 2,198,725 | 4/1940 | Smith | 250—221 X |
| 2,700,318 | 1/1955 | Snyder | 250—203 X |
| 2,728,835 | 12/1955 | Mueller | 250—211 X |
| 2,776,357 | 1/1957 | Porath | 250—239 X |
| 3,056,106 | 9/1962 | Hendricks | 340—228 |
| 3,173,019 | 3/1965 | Wormser | 250—203 X |
| 3,226,557 | 12/1965 | Goodman | 250—239 X |

WALTER STOLWEIN, Primary Examiner

U.S. Cl. X.R.

250—221, 237; 340—258